(12) United States Patent
Yamaoka et al.

(10) Patent No.: US 8,677,632 B2
(45) Date of Patent: Mar. 25, 2014

(54) STRING TRIMMER

(75) Inventors: Toshinari Yamaoka, Nanjing (CN); Fangjie Nie, Nanjing (CN); Huixing Fu, Nanjing (CN)

(73) Assignee: Chervon (HK) Limited, Hong Kong (HK)

( * ) Notice: Subject to any disclaimer, the term of this patent is extended or adjusted under 35 U.S.C. 154(b) by 295 days.

(21) Appl. No.: 13/209,673

(22) Filed: Aug. 15, 2011

(65) Prior Publication Data
US 2012/0055033 A1    Mar. 8, 2012

(30) Foreign Application Priority Data

Sep. 2, 2010    (CN) ...................... 2010 2 0516236 U

(51) Int. Cl.
*A01D 34/416*    (2006.01)

(52) U.S. Cl.
USPC ............................................... 30/276; 56/12.7

(58) Field of Classification Search
None
See application file for complete search history.

(56) References Cited

U.S. PATENT DOCUMENTS

| | | | |
|---|---|---|---|
| 4,285,128 A * | 8/1981 | Schnell et al. .................. | 30/276 |
| 4,369,577 A * | 1/1983 | Gise et al. ....................... | 30/276 |
| 4,761,939 A * | 8/1988 | Zerrer ............................. | 56/12.7 |
| 5,771,582 A * | 6/1998 | Tuggle ............................ | 30/125 |
| 6,588,109 B2 * | 7/2003 | Wilson ............................ | 30/276 |
| 7,314,096 B2 * | 1/2008 | Shaffer et al. ................. | 172/372 |

* cited by examiner

Primary Examiner — Hwei C Payer
(74) Attorney, Agent, or Firm — Greenberg Traurig, LLP

(57) ABSTRACT

A string trimmer has a blade storage mechanism wherein the blade storage mechanism has a cavity arranged on the body of the string trimmer for storing a blade.

7 Claims, 3 Drawing Sheets

STRING TRIMMER

RELATED APPLICATION DATA

This application claims the benefit of CN 201020516236.8, filed on Sep. 2, 2010, the disclosure of which is incorporated herein by reference in its entirety.

BACKGROUND

The following generally relates to a string trimmer and, more particularly, to a string trimmer in which the blade can be stored conveniently.

String trimmers are known tools for maintaining a lawn and are usually used in a location where four-wheel mowers can not work, such as a wall side, a lawn edge, an underside of tables and chairs on a lawn, or a lawn under a tree with drooping leaves, etc. Such string trimmers generally comprise a main handle, a connecting rod with one end connected with the main handle, and a power cutting device mounted on the other end of the connecting rod, wherein the power cutting device comprises a power output device and a cutting assembly connected with the output shaft of the power output device. The cutting device commonly comprises a cutting blade (generally a plastic blade).

During the normal working process of a string trimmer, the cutting blade is worn very quickly and needs to be replaced frequently, so the operator usually needs to carry about many spare blades.

There are two known methods for storing the spare blades of a string trimmer. In one method, the spare blades are suspended from a cantilevered shaft-shaped part on the handle or other suitable position of the machine, wherein a blade buckles this shaft-shaped part. The deficiency of this method is that the blade is not stored stably enough and at the same time it is not attractive enough. In another method, a blade storage device is mounted on a retractable rod or other suitable position of the machine, wherein the blade storage device is provided with a blade storage cavity in which the blade is stored. With this type of device it is inconvenient to take the blade out therefrom.

SUMMARY

The following describes a string trimmer with a blade storage mechanism which has a simple structure and which is convenient to use. More particularly, the following describes a blade storage mechanism for a string trimmer characterized in that the blade storage mechanism has a cavity arranged on the body of the string trimmer. The cavity may be arranged on a shield, a rear handle, or a connecting tube of the string trimmer. The cavity may also be located on an auxiliary handle wherein the auxiliary handle comprises a mounting sleeve and wherein the cavity is circumferentially arranged around the mounting sleeve. Preferably, such a cavity would be long in shape and may be further provided with a side surface that is arc-shaped. Still further, a blade locking mechanism may also be arranged in the cavity wherein the blade locking mechanism comprises an elastic piece arranged at a side surface opposite to the arc-shaped side surface in the cavity. The elastic piece may thus be arranged at an entrance of the cavity and be arranged to simultaneously extend towards the interior and the other side surface of the cavity. In this manner, when the blade is inserted a certain depth into the cavity, the blade is tightly compacted and fixed by the elastic piece to achieve the object of storage. This arrangement is also attractive and practical while allowing the blade to be replaced conveniently and quickly.

DETAILED DESCRIPTION

The following describes a preferred embodiment of a string trimmer with reference to the accompanying drawings.

Figure 1:
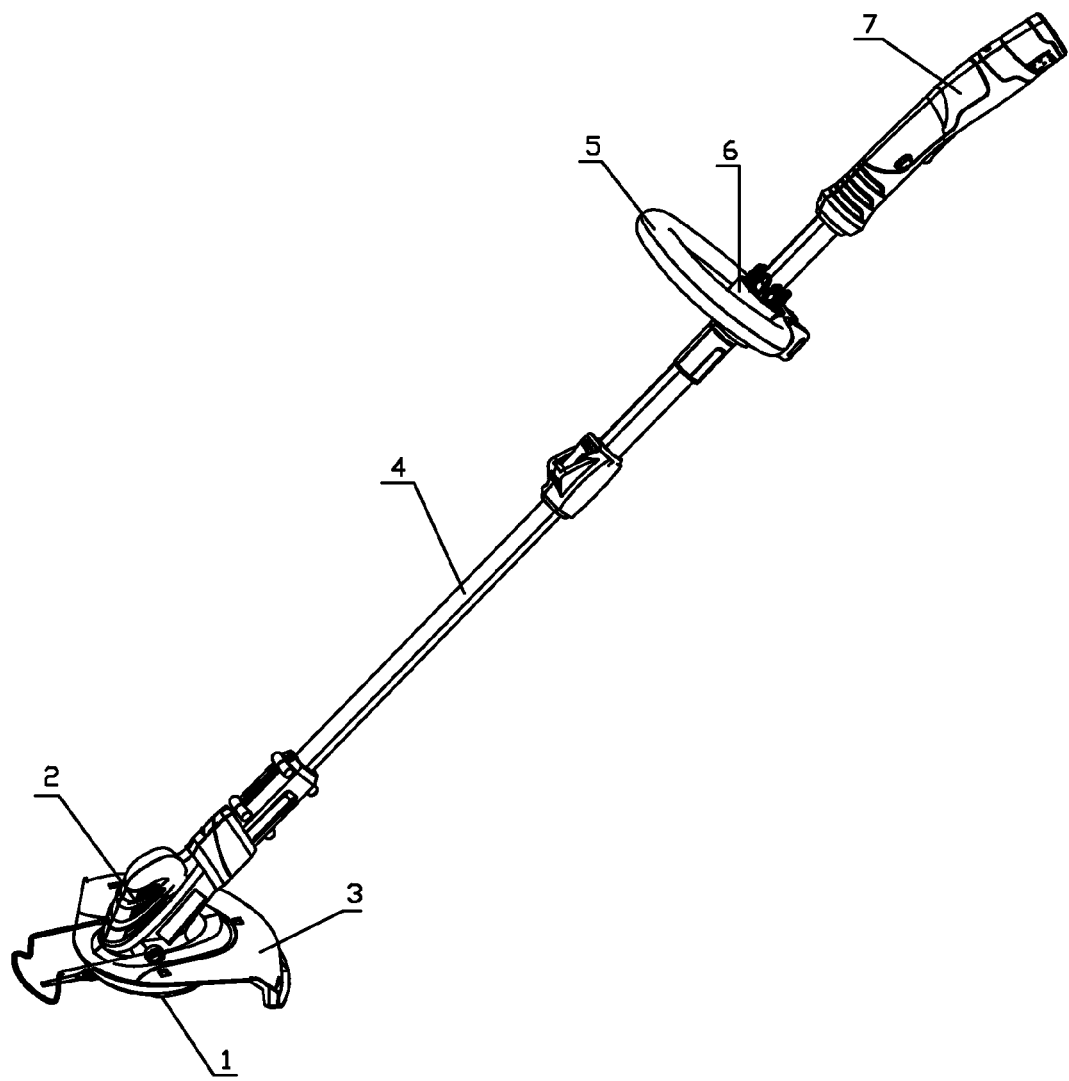
FIG. 1 is a schematic view illustrating an exemplary string trimmer constructed according to the description that follows.

FIG. 1 is a schematic view illustrating the whole structure of an exemplary string trimmer having a working mechanism 1, a motor 2, a shield 3, and a retractable connecting tube 4. An auxiliary handle 5 and a rear handle 7 (e.g., the main handle) are arranged on the upper end of the retractable tube 4. The auxiliary handle 5 includes a quick-clamping sleeve 6 and is releasably fixed on the retractable tube 4 via the quick-clamping sleeve 6. As a mounting sleeve for the auxiliary handle, in other embodiments, the quick-clamping sleeve also can be replaced by mounting sleeves in other forms or structures which can be quickly loosened or which cannot be loosened quickly. In other embodiments, the connecting tube also can be a non-retractable structure and also can be replaced by the solid connecting rod.

Figure 2:
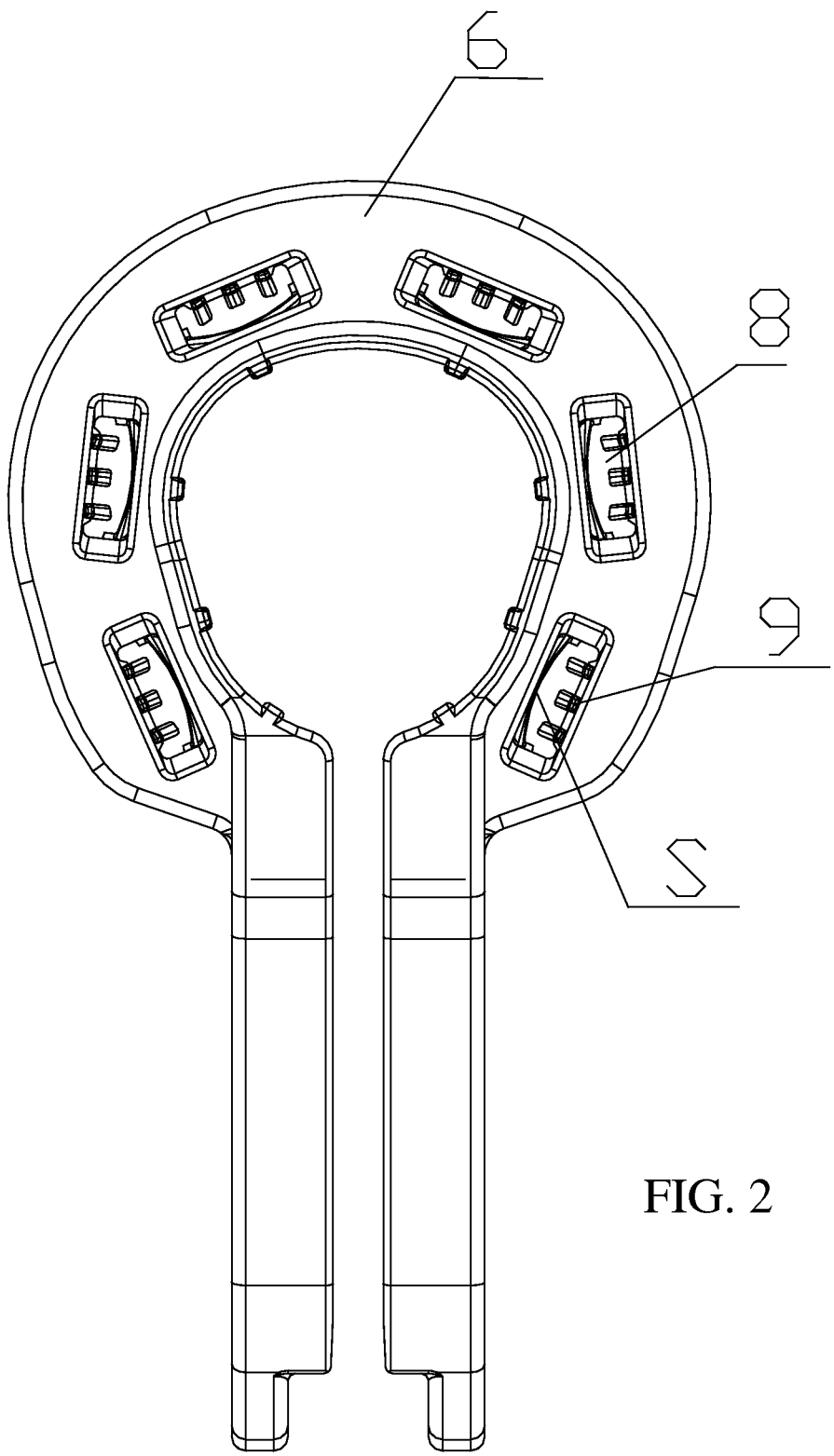
FIG. 2 is a schematic view illustrating an exemplary blade storage mechanism associated with an auxiliary handle of the string trimmer.

FIG. 2 is a schematic view illustrating the arrangement of the blade storage mechanism which is associated with the quick-clamping sleeve of the auxiliary handle of the string trimmer. The blade storage mechanism comprises one or more long-shaped cavities 8 which are arranged on the quick-clamping sleeve of the auxiliary handle and, when more than one is provided, circumferentially around the quick-clamping sleeve and parallel to the connecting tube. According to the outer diameter of a conventional quick-clamping sleeve 6, the quick-clamping sleeve 6 can be provided with six cavities.

Figure 4:
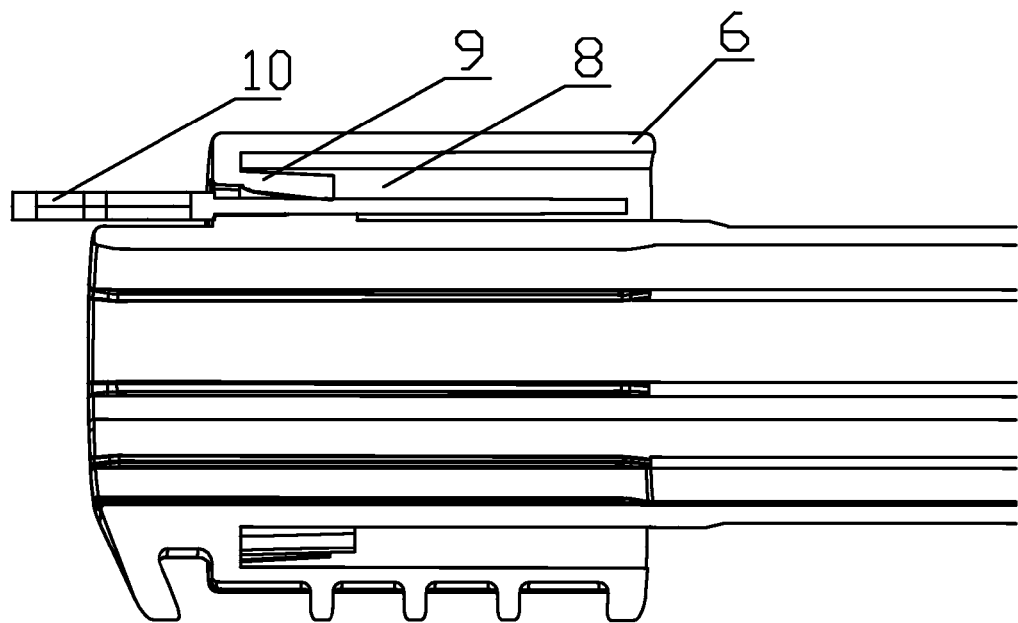
FIG. 4 is a structural schematic view illustrating an elastic piece of the blade storage mechanism of FIG. 2.

FIG. 4 is a structural schematic view illustrating an elastic piece of the blade storage mechanism of the string trimmer. A blade locking mechanism is arranged within the cavity and comprises an elastic piece 9 arranged on one side surface of the cavity. The other side surface (S) of the cavity is arc-shaped, wherein the elastic piece 9 is arranged at the entrance of the cavity and simultaneously extends towards the interior and the other side surface of the cavity. The elastic piece 9 can be selected from a plastic elastic piece, a metallic elastic piece or other components which can provide the elasticity.

Figure 3:
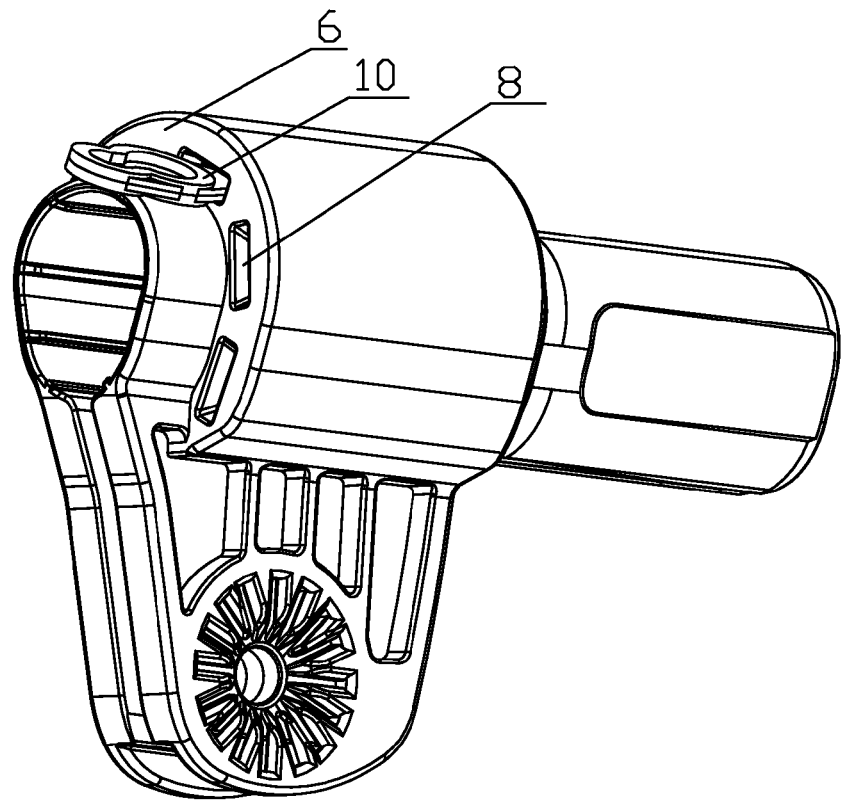
FIG. 3 is a schematic view illustrating the string trimmer with a blade being inserted in the blade storage mechanism of FIG. 2.

The blade 10 is inserted from the entrance of the blade storage cavity of the quick-clamping sleeve until both side surfaces of the blade come into contact with the inclined planes on both sides of the entrance of the cavity respectively. At this time, the plastic elastic piece 9 in the cavity is pushed away by the blade, so that the plastic elastic piece 9 in the cavity and the arc-shaped surface thereunder form a clip-shaped structure to clamp and fix the blade 10 within the device as illustrated in FIGS. 3 and 4.

The appearance of the blade storage mechanism is attractive and it is convenient and quick for the user to replace the blade and access the blade.

The skilled person in the art could conceive that, in other embodiments, the blade storage cavity is not arranged on the mounting sleeve of the auxiliary handle but on other suitable positions such as the shield, the rear handle, the auxiliary handle, the connecting tube, etc. Herein, the auxiliary handle, the shield, the rear handle, the connecting tube and the like are all portions of the body of the string trimmer.

While the above describes a preferred embodiment, this preferred embodiment is not to be used to limit the scope of the invention claimed. Rather, the technical solutions of the preferred embodiment may be obtained by equal replacement or equivalent transformation all of which are intended to fall within the protective scope of the present invention.

What is claimed is:

1. A string trimmer, comprising:
   a string trimmer body; and
   a blade storage mechanism arranged on the string trimmer body, the blade storage mechanism having a plurality of cavities located on an auxiliary handle of the string trimmer body for accepting a plurality of string trimmer blades, wherein the auxiliary handle comprises a mounting sleeve, and the plurality of cavities are circumferentially arranged around the mounting sleeve.

2. The string trimmer according to claim 1, wherein an elongated shape is provided to the cavity.

3. The string trimmer according to claim 2, wherein an arc-shape is provided to one side surface of the cavity.

4. The string trimmer according to claim 3, wherein the blade storage mechanism comprises a blade locking mechanism arranged in the cavity.

5. The string trimmer according to claim 4, wherein the blade locking mechanism comprises a resilient piece arranged at a side surface in the cavity opposite to the arc-shaped side surface.

6. The string trimmer according to claim 5, wherein the resilient piece is arranged at an entrance of the cavity and extends towards the interior and the other side surface of the cavity.

7. The string trimmer according to claim 5, wherein the resilient piece is constructed from one of a plastic material and a metallic material.

\* \* \* \* \*